(12) United States Patent
Akhavan-Saraf et al.

(10) Patent No.: US 10,015,791 B2
(45) Date of Patent: *Jul. 3, 2018

(54) WIRELESS RADIO ACCESS POINT CONFIGURATION

(71) Applicant: Fortinet, Inc., Sunnyvale, CA (US)

(72) Inventors: Koroush Akhavan-Saraf, San Jose, CA (US); Jose Luis Villarreal Reverte, Simi Valley, CA (US)

(73) Assignee: Fortinet, Inc., Sunnyvale, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/939,641

(22) Filed: Nov. 12, 2015

(65) Prior Publication Data

US 2016/0081092 A1  Mar. 17, 2016

Related U.S. Application Data

(63) Continuation of application No. 14/488,514, filed on Sep. 17, 2014, now Pat. No. 9,288,844.

(51) Int. Cl.
*H04W 72/04* (2009.01)
*H04W 88/10* (2009.01)
*H04W 24/02* (2009.01)
*H04W 84/12* (2009.01)
*H04W 72/08* (2009.01)
*H04W 72/12* (2009.01)

(52) U.S. Cl.
CPC ....... *H04W 72/0453* (2013.01); *H04W 24/02* (2013.01); *H04W 72/082* (2013.01); *H04W 72/1226* (2013.01); *H04W 84/12* (2013.01); *H04W 88/10* (2013.01)

(58) Field of Classification Search
None
See application file for complete search history.

(56) References Cited

U.S. PATENT DOCUMENTS 6,718,161 B1 * 4/2004 Westall ............... H04B 7/2041
455/12.1
6,970,682 B2  11/2005 Crilly et al.
(Continued)

FOREIGN PATENT DOCUMENTS

CN  102355290  2/2012

OTHER PUBLICATIONS

Notice of Allowance for U.S. Appl. No. 14/488,514 dated Jan. 29, 2016.
(Continued)

*Primary Examiner* — Christine Duong
(74) *Attorney, Agent, or Firm* — Hamilton, DeSanctis & Cha LLP

(57) ABSTRACT

Methods and systems for configuring an access point (AP) are provided. According to one embodiment, a wireless network architecture includes multiple dual concurrent wireless access points, each including dual radios and dual antennas. The dual radios are configured to operate in a same frequency band and include multiple channels within the frequency band. The dual radios in each of the dual concurrent wireless access points are configured with different channels. The dual concurrent wireless access points are configured in a cell pattern, configured to use all of the channels within the frequency band.

20 Claims, 15 Drawing Sheets

(56) References Cited

U.S. PATENT DOCUMENTS

| | | |
|---|---|---|
| 9,191,081 B2 | 11/2015 | Hinman et al. |
| 9,288,844 B1 | 3/2016 | Akhavan-Saraf et al. |
| 2003/0020651 A1 | 1/2003 | Crilly et al. |
| 2010/0178934 A1* | 7/2010 | Moeglein ............... G01S 19/12 455/456.1 |
| 2011/0078754 A1* | 3/2011 | Howcroft ........... H04N 7/17318 725/110 |
| 2011/0235755 A1* | 9/2011 | Yang ................... H04B 7/0413 375/340 |
| 2013/0002373 A1 | 1/2013 | Robert et al. |
| 2014/0029520 A1 | 1/2014 | Farricker |
| 2014/0254700 A1* | 9/2014 | Hinman ............... H04B 7/0413 375/267 |
| 2015/0110049 A1* | 4/2015 | Pabla .................. H04B 7/0697 370/329 |
| 2016/0081092 A1 | 3/2016 | Akhavan-Saraf et al. |

OTHER PUBLICATIONS

Non-Final Rejection for U.S. Appl. No. 14/488,514 dated Sep. 23, 2015.
Final Rejection for U.S. Appl. No. 14/488,514 dated Apr. 1, 2015.
Non-Final Rejection for U.S. Appl. No. 14/488,514 dated Oct. 31, 2014.
English Abstract for CN Publication No. 102355290 (A), published Feb. 15, 2012.

* cited by examiner

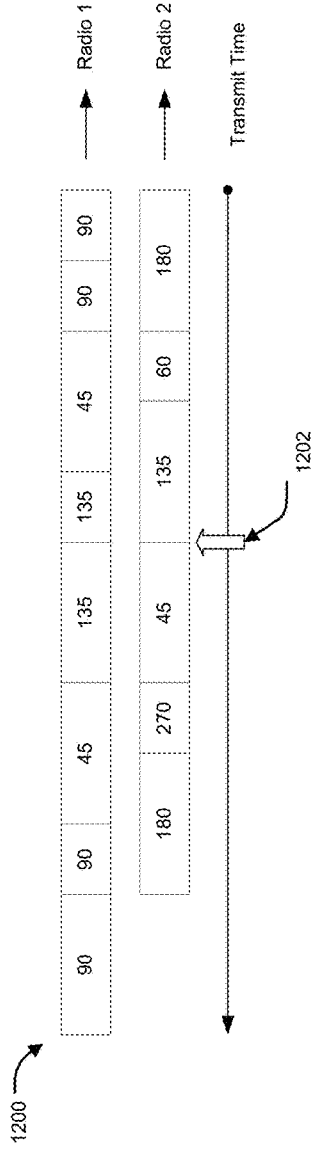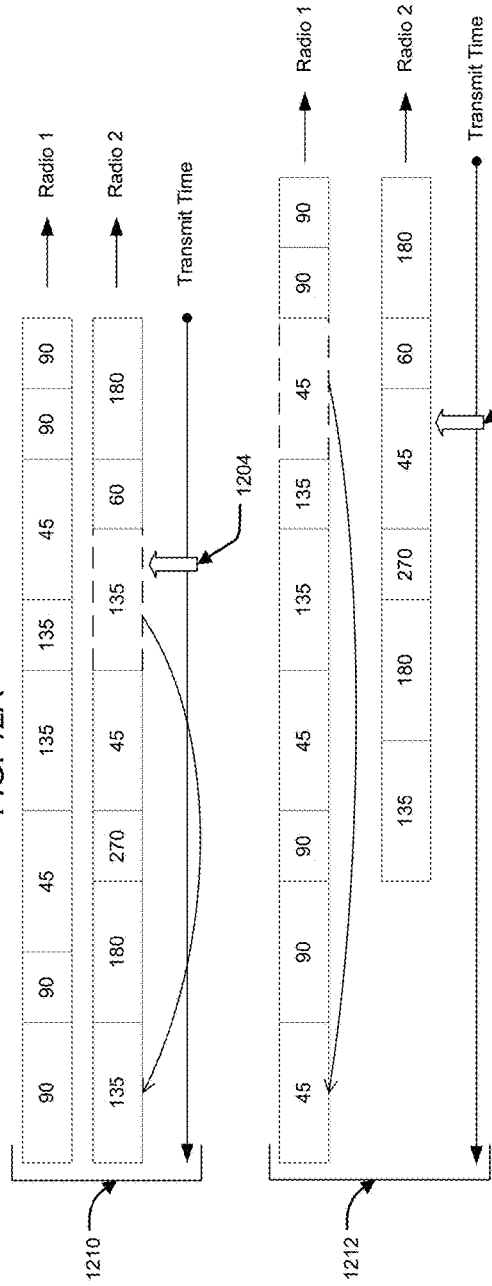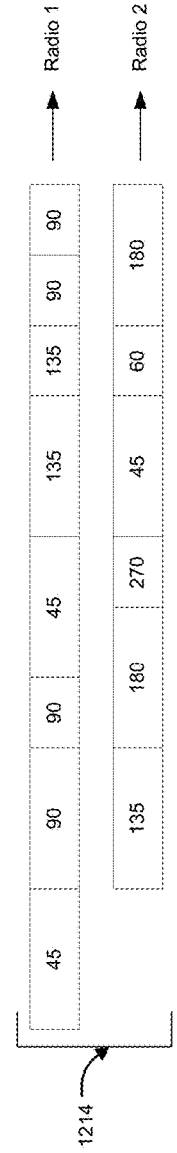

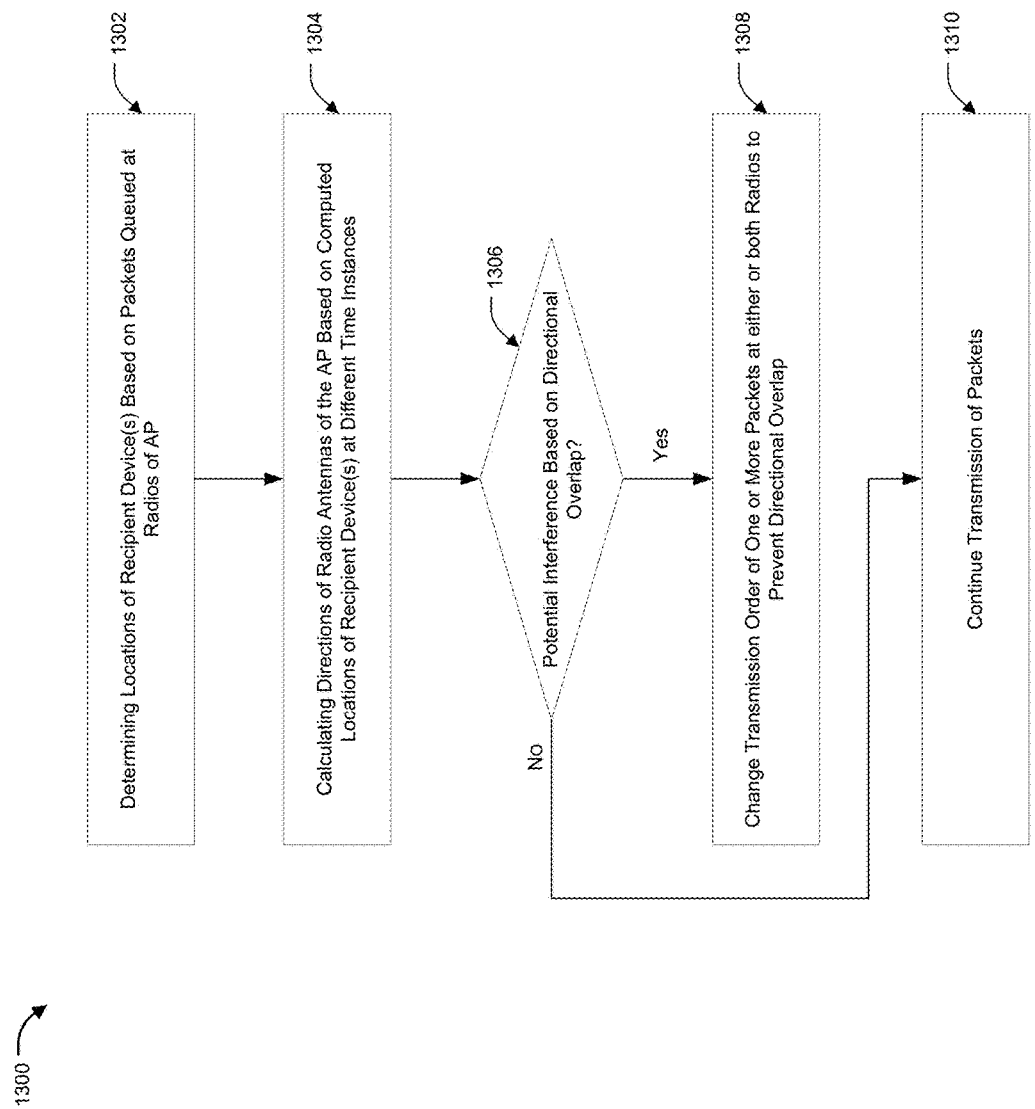

WIRELESS RADIO ACCESS POINT CONFIGURATION

CROSS-REFERENCE TO RELATED APPLICATIONS

This application is a continuation of U.S. patent application Ser. No. 14/488,514, filed Sep. 17, 2014, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014-2015, Fortinet, Inc.

BACKGROUND

Field

Embodiments of the present disclosure generally relate to the field of computer networks. In particular, various embodiments relate to methods and systems for configuring, arranging, placing or otherwise locating radio access points in a manner that allows optimum utilization of available radio channels and have lower channel interference for a given coverage area.

Description of the Related Art

Wireless communication systems are widely deployed to provide various communication services such as voice, video, packet data, messaging, broadcast, etc. With the number of wireless-enabled computing devices such as smartphones, laptops, PCs, tablets, among other like devices growing by leaps, demand for wireless communication technology has grown tremendously in the last few years. Users have now come to expect long-range wireless network connections for such devices wherever they go (e.g., work, hotels, coffee shops, libraries, etc.). Typically, for each computing device to participate in a wireless communication, the device needs to have an in-built radio transceiver or has to be operatively coupled to a radio transceiver.

A wireless Access Point (AP) is an example of a wireless network device that comprises one or more radios and allows computing devices to connect to a wired network or other computing devices. A wireless AP typically includes a local link interface to communicate with local client devices, and a downlink/uplink interface to communicate with other APs. With the creation of APs, network users and/or administrators are able to add computing devices to a network with few or no cables and are able to increase available bandwidth to wireless-enabled computing devices by deploying additional APs tuned to non-overlapping channels. An AP may be directly connected to a wired Ethernet connection, providing wireless connections to other devices to utilize the wired connection of Ethernet using radio frequency links. APs may support connection of multiple computing devices to a single wired connection and may send/receive data packets using radio frequencies defined by the Institute of Electrical and Electronics Engineers (IEEE) 802.11 family of wireless networking standards.

Typically, a radio, depending on its characteristics, has multiple channels and a defined coverage range. For instance, a 2.4 GHz frequency radio has 3 non-overlapping channels (1, 6, and 11) and a 5 GHz frequency radio has 37 channels (where the number of actual usable channels depends on, among other factors, the make of the AP, indoor or outdoor placement of the AP, height above ground, nearby obstructions, type of antenna, etc.). The range of a typical 5 GHz radio AP is half of that of a typical 2.4 GHz radio AP. As multiple radios may be incorporated in a single AP, it is important to have non-overlapping channels within the AP and across multiple APs. For instance, in a dual band/radio AP, one channel of 2.4 GHz may be positioned along with one channel of 5 GHz radio, allowing concurrent 2.4 GHz and 5 GHz access across 802.11a/n and 802.11b/g/n connections. Configuration of multiple dual APs in a building or an infrastructure, each having a 2.4 GHz and a 5 GHz radio, may involve repeating of one or more channels for 2.4 GHz radio APs for every fourth AP, which makes the infrastructure non-efficient as 2.4 GHz radio APs have longer range and therefore closely placed 2.4 GHz radio APs are bound to have co-channel interference. As such, high-density configurations of 2.4 GHz radio APs contributes to underutilization of potential bandwidth that may be provided by the 2.4 GHz radio APs. In continuation, in existing solutions that have both 2.4 GHz and 5 GHz radios in a dual AP, in a building that requires a large number of APs to be configured, say twenty non-overlapping 5 GHz channels, 20 different APs, each having a 5 GHz radio would be needed, which further makes the wireless network architecture expensive and substantially more cumbersome.

Furthermore, RF signals, when transmitted, do not just stop at the clients for which they are intended. Therefore, the RF energy in the RF signals, when strong enough, may to cause clients to defer transmissions due to "busy" clear channel assessments. The distance traveled by RF signals might be hundreds of feet indoors, depending on the environment. In addition to the energy emitted by AP transmissions, energy emitted by client transmissions also needs to be considered and taken into account, which the existing solutions fail to do. As clients move away from APs while transmitting, they cause co-channel interference at an even greater range than the AP may cause, for which reason, it is important to avoid interference from such clients.

FIGS. 1A and 1B illustrate an exemplary co-channel interference issue in the context of a typical dual radio access point (AP) configuration 100. As can be seen, FIG. 1 illustrates multiple 2.4 GHz/5 GHz APs 102-1, 102-2, 102-3, . . . , 102-20, collectively referred to as 102 hereinafter, wherein 3 channels (1, 6, and 11) of 2.4 GHz, and 20 channels (36, 40, . . . , 149) of 5 GHz are configured in the network architecture. In addition, four additional channels (153, 157, 161, and 165) of 5 GHz have been shown as being unutilized. In such an architecture, as channels 1, 6, and 11 of 2.4 GHz are configured closely with each other (yielding higher density configuration), as shown in FIG. 1B, and have a longer range when compared with those of channels of 5 GHz radio, co-channel interference increases significantly and a number of 2.4 GHz radios would go underutilized in case such interference is attempted to be handled by disabling channels of certain 2.4 GHz radios. As shown through representation 150 of FIG. 1B, channel 6 of the 2.4 GHz radios is densely packed giving high interference. Yet another disadvantage of this configuration 100 relates to antenna coupling, which is caused when two antennas (configured to radiate and/or receive radio signals) exist in the same frequency band and are close to each other so as to cause energy from one antenna to couple with that of the other and appear as the received signal. Such received signals result in loss of gain and directional transmission overlap, which is undesirable.

There is therefore a need for an efficient AP and configuration thereof that can help optimally use available channels, prevent co-channel interference, and further reduce/prevent antenna coupling and issues related thereto. This problem addressed by this disclosure is applied mainly for in indoor AP installations.

SUMMARY

Methods and systems are described for configuring an access point (AP). According to one embodiment, a wireless network architecture includes multiple dual concurrent wireless access points, each including dual radios and dual antennas. The dual radios are configured to operate in a same frequency band and include multiple channels within the frequency band. The dual radios in each of the dual concurrent wireless access points are configured with different channels. The dual concurrent wireless access points are configured in a cell pattern, configured to use all of the channels within the frequency band.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 12A-C illustrate exemplary reordering of packet transmission when potential antenna interference is detected in accordance with an embodiment of the present disclosure.

FIG. 13 is flow diagram illustrating steering of antenna(s) of a dual radio AP in accordance with an embodiment of the present disclosure.

DETAILED DESCRIPTION

Figure 1A:
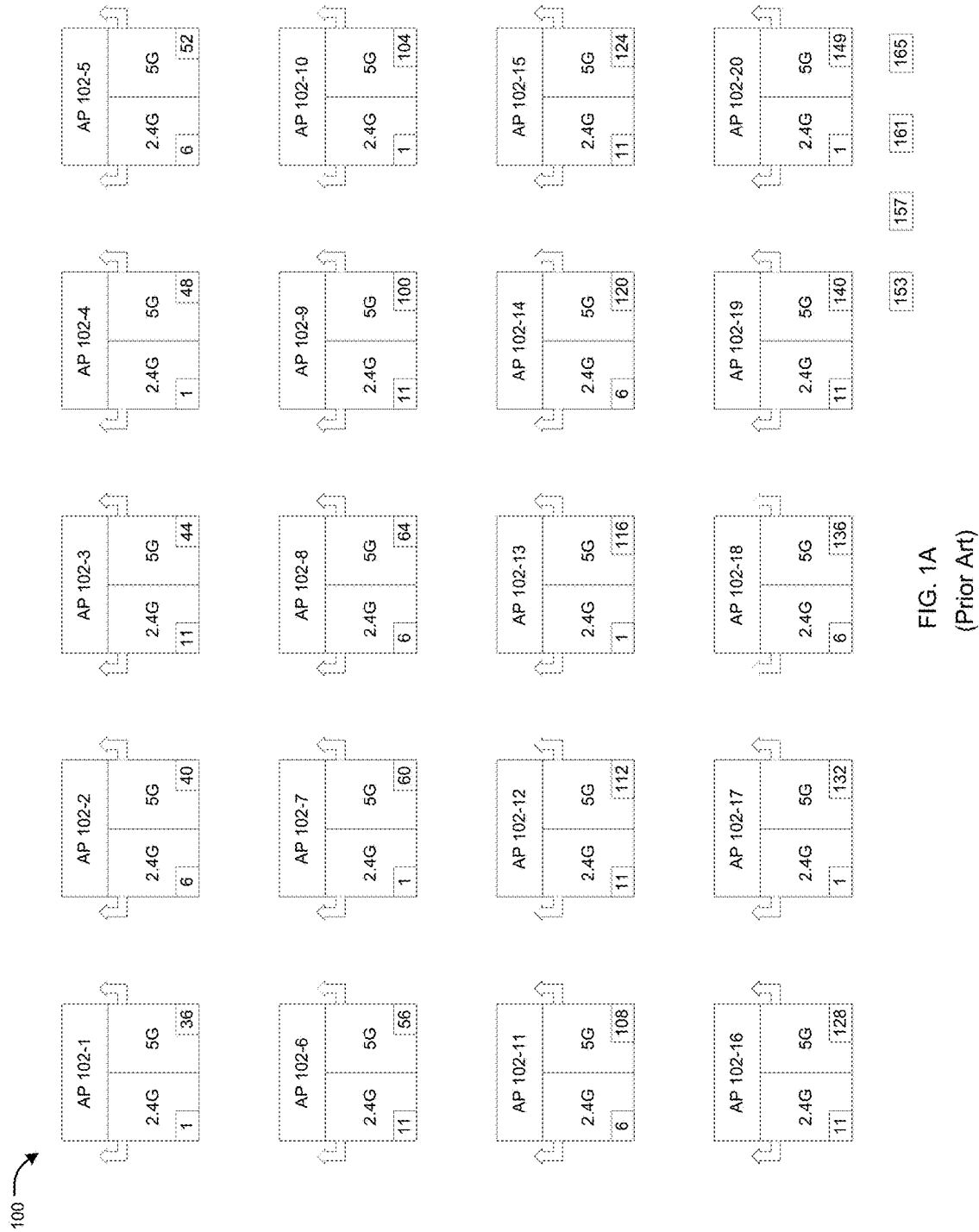
FIGS. 1A and 1B illustrate an exemplary co-channel interference issue in the context of a typical dual radio access point (AP) configuration.

Methods and systems are described for configuring an access point (AP) so as to optimally use channels of AP radios, prevent co-channel interference and also address antenna coupling in order to reduce interference between two radios transmitting and receiving at the same time on same channel or adjacent channels. Embodiments of the present disclosure generally relate to methods and systems for implementing dual-radio access points in a wireless network configuration. Various embodiments of the present disclosure relate to methods and systems for configuring, arranging, placing or otherwise locating radio access points in a manner that allows optimum utilization of available radio channels, and have lower channel interference for a given coverage area. One aspect of the present disclosure provides a dual concurrent 5 GHz radio AP, wherein each 5 GHz radio of the AP is configured with a different channel in a manner such that overall throughput of the AP is maximized and co-channel interference is minimized. Another aspect of the present disclosure provides a wireless network comprising multiple dual APs having at least one dual concurrent 5 GHz radio AP. A set of dual APs of the wireless network may be configured such that as many non-repeating channels of 5 GHz radios as possible may be incorporated. Such configuration of the dual concurrent 5 GHz radios provides same or better coverage and bandwidth than existing systems, but significantly reduces the number of APs required for achieving the desired coverage when compared with use of dual radio APs having one 5 GHz radio and one 2.4 GHz radio.

According to one embodiment, wireless network of the present disclosure comprises one or more 2.4 GHz radios, wherein the 2.4 GHz radios use respective channels (1, 6, and 11) such that their configuration does not cause co-channel interference, which is otherwise common in conventional systems that incorporate high-density of 2.4 GHz radios. According to one implementation, wireless network comprises multiple cells, wherein each cell, for instance, may include 7 dual APs, 6 of which may be dual concurrent radio 5 GHz APs formed around a circle, and one dual AP in the center having one 5 GHz radio and one 2.4 GHz radio. Multiple such cells may then be repeated/replicated in an order that allows different channels of 2.4 GHz radio to be incorporated to reduce interference. In an implementation, any other cell structure having at least one proposed dual radio 5 GHz AP may be incorporated and such constructions/configurations/structure are well within the scope of the present disclosure.

According to another embodiment, channels of 5 GHz radios of a given AP may be separated by a channel separation index, wherein the index may be configured such that throughput of the AP is maximized without compromising on the co-channel interference. In an instance, separation index may be of 4 channels giving rise to APs, for instance, having one 5 GHz radio channel to be 36 and the second 5 GHz radio channel to be 40 or any other channel having a higher separation index. Similarly pairs of (100, 104), (136,140), and the like may be formed. In an implementation, one or more channel selection algorithms may be incorporated and configured to dynamically assign channels to APs based on the predefined channel separation index.

According to one embodiment, present disclosure further comprises an access point radio antenna steering system configured to manage and prevent coupling of energy from antennas that are in same frequency band. In an implementation, antenna steering system of the present disclosure enables change in the order and timing of packets when it is determined that antenna interference would take place if the packets, as queued, are transmitted. In an embodiment, antenna steering system of the present disclosure may include a recipient device location determination module, a direction identification module, an interference detection module, and a transmission module.

According to one embodiment, recipient device location determination module may be configured to compute locations of recipient devices based on packets queued at radios of a given dual AP. Computation of the location of recipient devices at both radios of the dual AP and knowledge of the current location of the given dual AP allows a determination to be made regarding the direction in which the antennas would need to be steered for transmission of the packets. Direction identification module is configured to calculate the direction of the radio antennas of the dual AP based on the locations of the recipient devices. Such direction, in an instance, may be represented as angles such as 45, 135, 90, 270 that the antenna would have to be directed to for transmission of packets to recipient devices.

According to one embodiment, interference detection module is configured to determine whether an interference would take place if packets, as queued, are transmitted, wherein the interference is determined based on the calculated direction and timing (of transmission) of the radio antennas of the AP. Once it is determined as to whether interference would take place, transmission module may be configured to transmit packets without interference such that when the interference detection module detects that interference would take place, order of the queued packets of one or more radios may be changed/shuffled so as to prevent any interference.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of efficiently configuring and implementing dual radio access points (APs), it should be appreciated that the same has been done merely to illustrate the disclosure in an exemplary manner and any other purpose or function for which the explained structure or configuration may be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named Methods and systems are provided for configuring an access point (AP) and a wireless network of access points (APs) so as to optimally use the channels of AP radios, prevent co-channel interference, and also handle antenna coupling in order to reduce the loss of gain. According to one embodiment of the present disclosure, dual concurrent 5 GHz radio APs are designed to overcome limitations of co-channel interference, provide the same or better coverage with fewer access points (APs), handle antenna coupling, and maintain peak performance of operation. Different embodiments of the present disclosure provide different cell structures using the proposed dual concurrent 5 GHz radio APs such that non-repeating channels are assigned to the radios of the same dual radio 5 GHz AP and/or to the radios of neighboring APs in order to avoid co-channel and/or near channel interference. In another embodiment of the present disclosure, potential channel coupling may be avoided using an AP radio antenna steering system. In an example embodiment, directional overlap between antennas of two radios of the proposed dual 5 GHz radio AP may be detected and avoided by steering the antenna and/or changing the order of packet transmission and/or rescheduling/shuffling the transmission queue.

Figure 2:
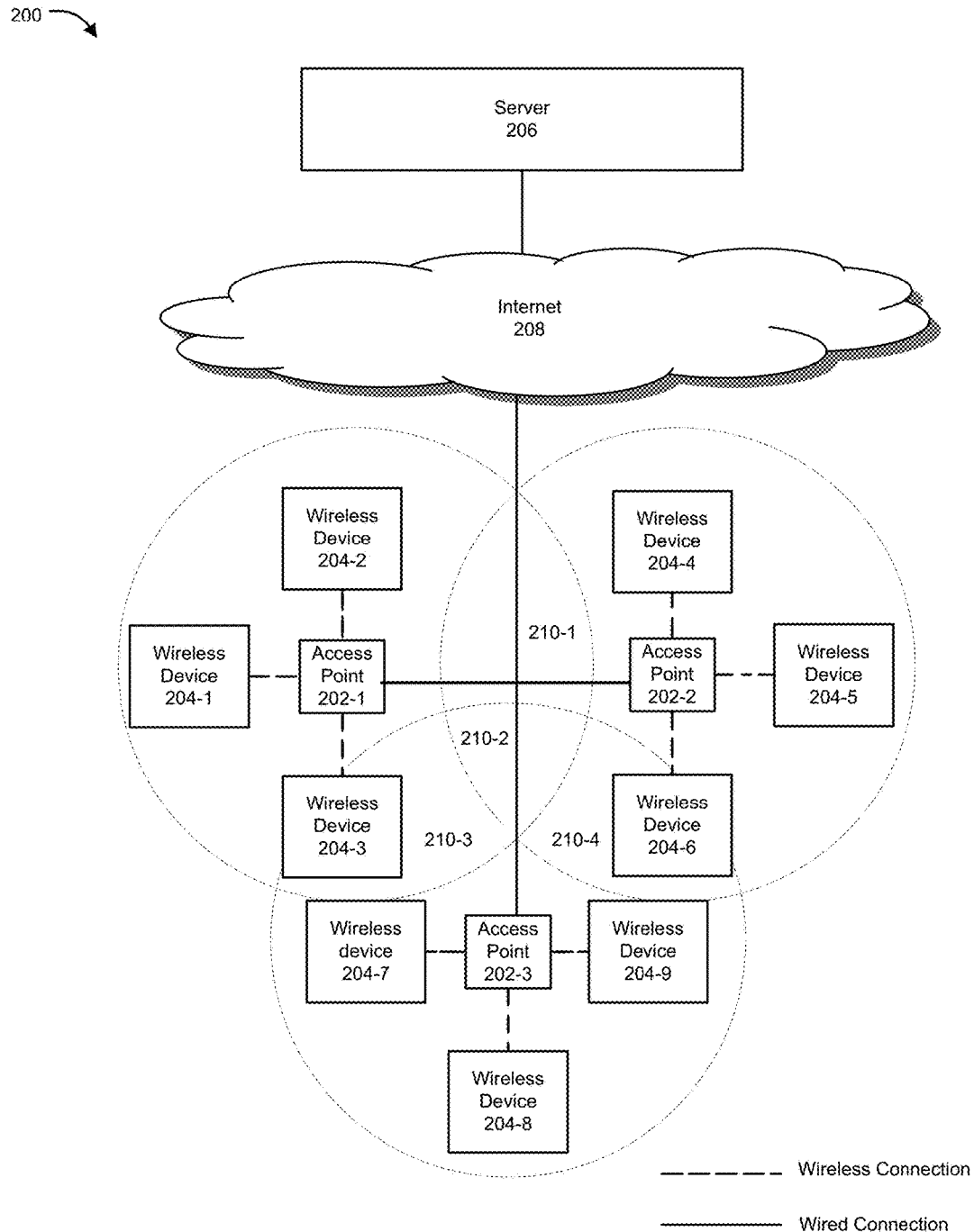
FIG. 2 illustrates an exemplary architecture of an access point (AP) based wireless network in accordance with an embodiment of the present disclosure.

FIG. 2 illustrates an exemplary architecture 200 of an AP-based wireless network in accordance with an embodiment of the present disclosure. In the present example, architecture 200 includes multiple APs, such as AP 202-1, 202-2, and 202-3, collectively referred to as APs 202. Each AP 202 may be configured to serve, through a wireless and/or a wired connection, multiple wireless devices 204-1, 204-2, . . . , 204-n, collectively referred to as wireless devices 204. APs 202 may also be operatively coupled with each other (e.g., through a wired connection) which enables each AP 202 to access requests from wireless devices 204 and send the requests for processing/fulfillment to one or more server(s) 206 through a network such as Internet 208. Access points 202 may be directly connected to Internet 208 using a high-speed link such as cable, xDSL, T1 connection, or any other desired means.

According to one embodiment, wireless architecture 200 may include a combination of conventional wireless communication equipment, such as multiple APs 102 and multiple dual radio APs having two 5 GHz radios (as described further below), antennas, base stations, switching equipment, and a wide area network transceiver configured for wireless data communication. Wireless AP, such as AP 202 may optionally include a global positioning system (GPS) device (not shown) to determine a location automatically for the wireless access point 202. APs 202 may be implemented in accordance with suitable wireless network standards, such as the wireless local area network standard IEEE 802.11 and related supplements a, b, e, f, h, h and i. Server such as 206 may include storage that has a map including access point locations, such as locations of the access points 202.

According to one embodiment, APs 202 may have a variety of configurations. For example, AP 202 may be a dual radio AP having both radios of 5 GHz as shown with reference to FIG. 3. In another embodiment, another dual radio AP 202 may have one radio of 5 GHz and another radio of 2.4 GHz. Such APs may, in an exemplary embodiment, have different capacities and ranges. In an implementation, the coverage area of multiple APs 202 may overlap with each other, wherein, with reference to FIG. 2, region 210-1 indicates the overlap between coverage areas of AP 202-1 and 202-2, region 210-3 indicates the overlap between coverage areas of AP 202-1 and 202-3, region 210-4 indicates the overlap between coverage areas of AP 202-2 and 202-3, and region 210-2 indicates the common overlap between coverage areas of AP 202-1, 202-2, and 202-3.

According to one embodiment, AP 202 may act as a WiFi (IEEE 802.11x) or as a Bluetooth access point. AP 202 may also act as a node in a Local Area Network (LAN), for example within a customer's home or business premises. One or more personal computers, such as the personal computer (PC) or other devices, may be connected through the LAN to AP 202. In a general sense, a particular AP 202 may provide an area of coverage for one or more wireless technologies (802.11x WiFi, Cellular, Bluetooth etc) and connect into one or more networks (LAN, MAN, cellular core, WAN/Internet etc). Thus, AP 202 may perform bearer translation between the radio interface and the network interface. For each pairing of radio bearer and network required by the wireless device, AP 202 preferably also performs authentication and provides a network address and connectivity.

Figure 3:
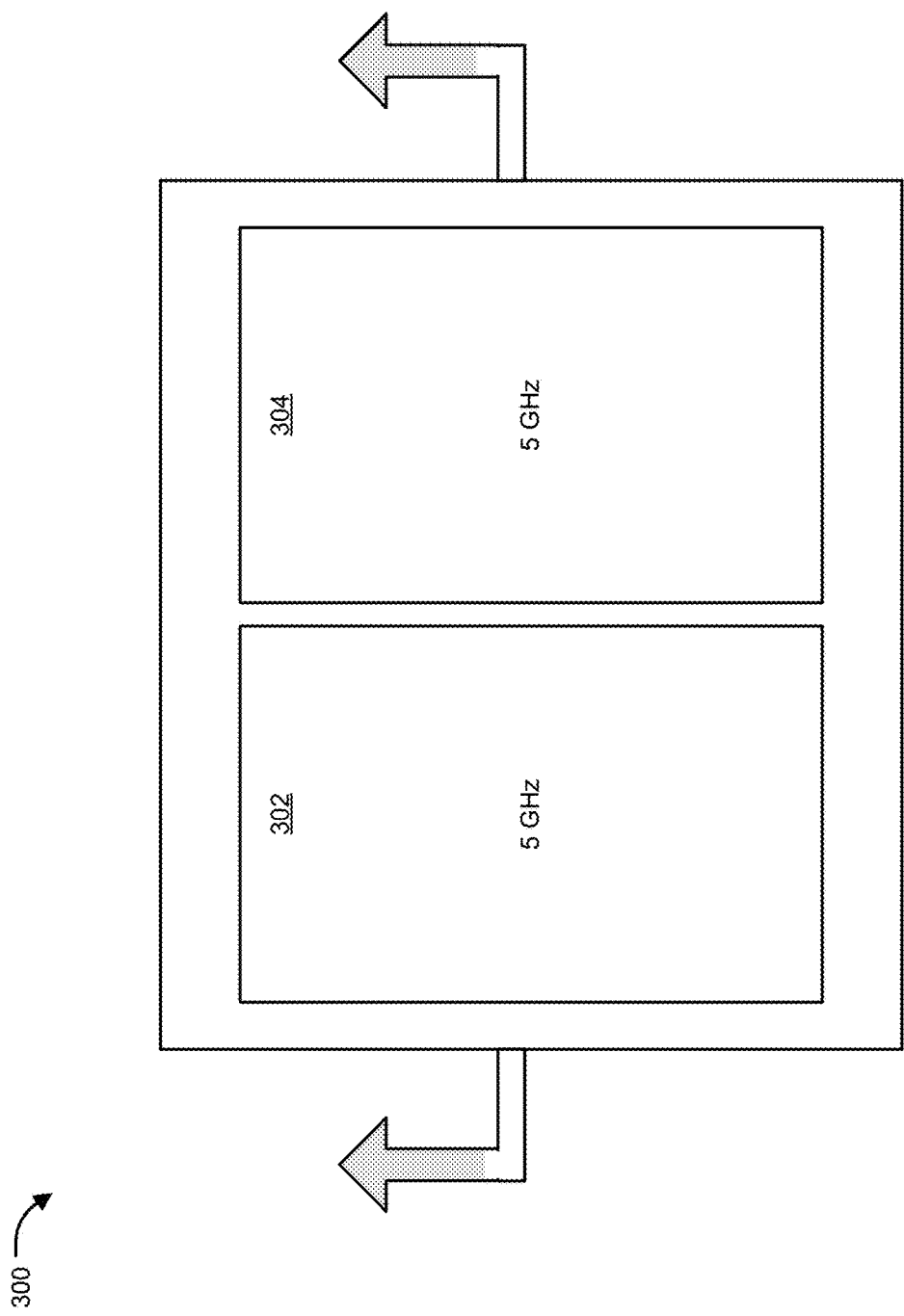
FIG. 3 illustrates a dual concurrent 5 GHz radio AP in accordance with an embodiment of the present disclosure.

FIG. 3 illustrates a dual concurrent 5 GHz radio AP 300 in accordance with an embodiment of the present disclosure. As illustrated, dual radio AP 300 may include two radios, a first 5 GHz radio 302 and a second 5 GHz radio 304, both being configured to work concurrently and/or independently on the AP 300. Both the first and the second radios 302 and 304 may be configured to use different channels in order to avoid co-channel interference. According to one embodiment, AP 300 may be a first IEEE 802.11 standard compliant dual radio wireless access point (AP) having a first coverage and configured to concurrently operate a first 5 GHz radio 302 and a second 5 GHz radio 304, wherein the first radio 302 of the first IEEE 802.11 standard compliant dual radio wireless AP may be tuned to a first channel such as 36, and the second radio 304 of the first IEEE 802.11 standard compliant dual radio wireless AP 300 may be tuned to a second channel such as 40 that is different from the first channel (36) and is adjacent or non-adjacent to the first channel (i.e. second channel 40 may also be 100, which is would then be non-adjacent to first channel 36).

According to one embodiment, multiple dual concurrent 5 GHz radio APs 300 may be configured, wherein the channels of radios of each AP may be configured such that co-channel interference is minimized and is non-overlapping. The channels, as mentioned above, may or may not be adjacent to each other. For instance, the first 5 GHz radio for a first AP may be configured to operate at channel number 36 and the second 5 GHz radio may be configured of the first AP to operate at channel number 40. Similarly, the first 5 GHz radio of a second AP may be configured to operate at channel number 52 and the second 5 GHz radio of the second AP may be configured to operate at channel number 56. According to another embodiment, wireless network of the present disclosure may further include multiple APs, one or more of which may be dual concurrent 5 GHz radio APs, and few others may be a dual radio AP having one 2.4 GHz radio and a 5 GHz radio, and yet another few may be of any other type single/dual radio configuration.

Figure 4:
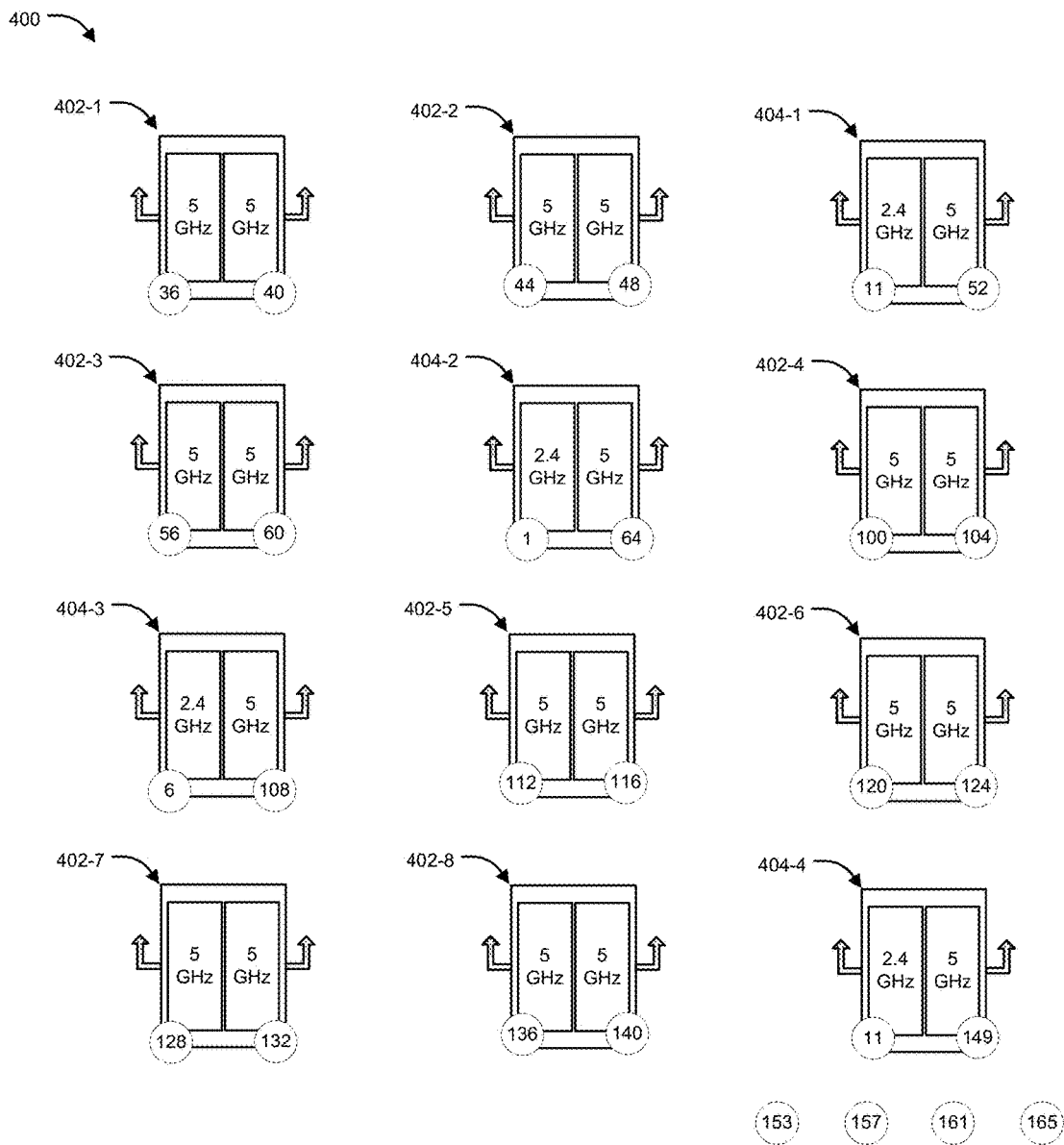
FIG. 4 illustrates an exemplary network configuration having multiple dual radio APs in accordance with an embodiment of the present disclosure.

FIG. 4 illustrates an exemplary network configuration 400 having multiple dual radio APs in accordance with an embodiment of the present disclosure. Those skilled in the art will appreciate that configuration 400 is exemplary in nature and any other number of different types/configurations/construction/setting of APs may be incorporated in the desired network configuration 400, and therefore any such configuration/layout of APs is completely within the scope of the present disclosure.

Figure 1B:
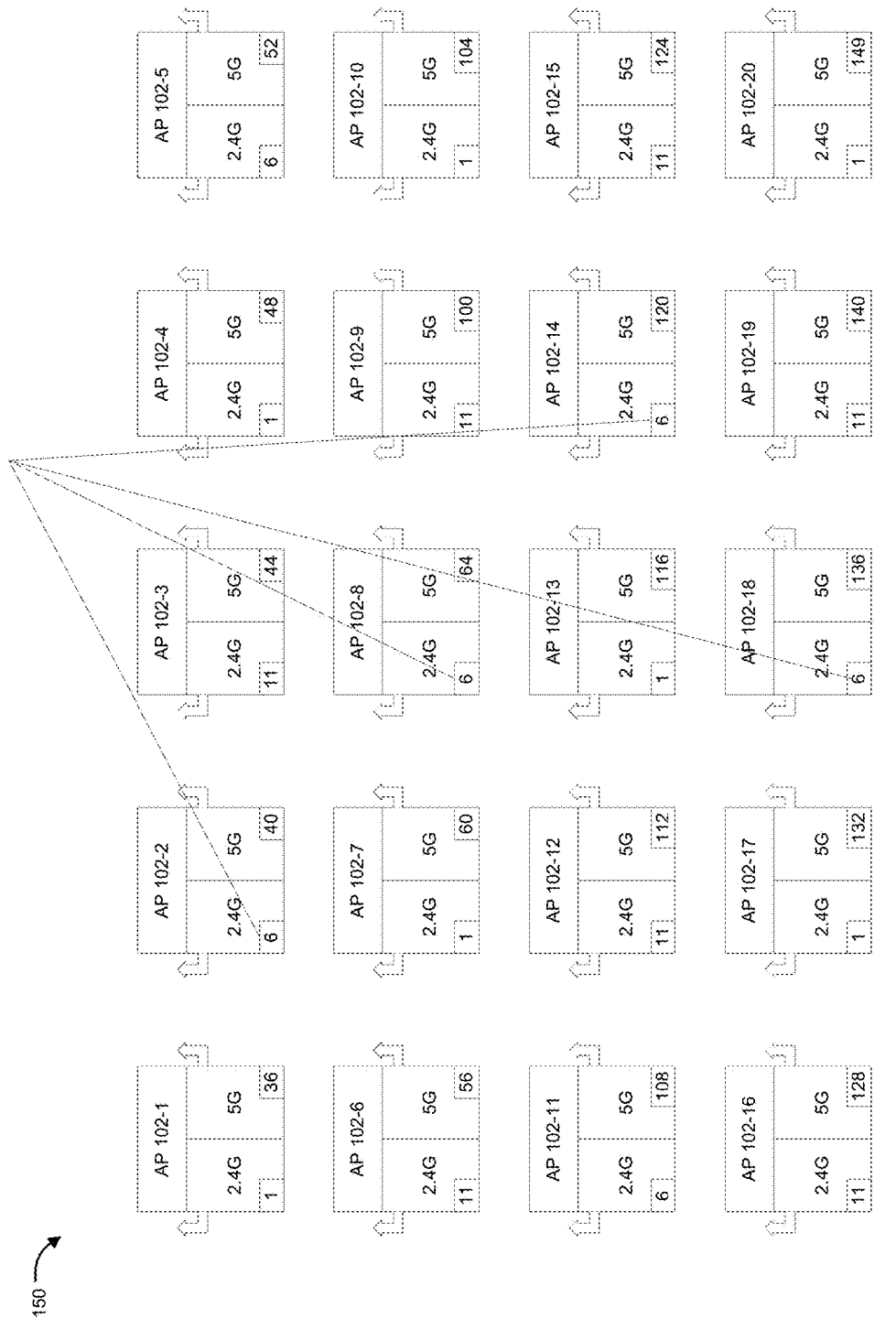

According to one embodiment, configuration 400 may include multiple dual concurrent 5 GHz radio APs 402-1, 402-2, 402-3, ..., 402-8, individually or collectively referred to as concurrent 5 GHz radio APs 402, and further include multiple 2.4 GHz/5 GHz dual radio APs 404-1, 404-2, 404-3, and 404-4, individually or collectively referred to as concurrent 2.4/5 GHz radio APs 404. As can be seen, each AP 402 may include two 5 GHz radios having different channels, wherein, for instance, AP 402-1 includes a first radio using channel 36 and a second radio using channel 40, and similarly, AP 402-6 includes a first radio using channel 120 and a second radio using channel 124. As the channel numbers are different and there are more number of unique/available channels in a 5 GHz radio, co-channel interference is minimized with such a configuration. Also, when compared with the configuration shown in the prior art configuration depicted in FIGS. 1A and 1B, use of dual concurrent 5 GHz radio APs 402 provides the same coverage and bandwidth but uses 66% fewer APs, i.e., instead of 20 APs being used in the prior art configuration depicted in FIGS. 1A and 1B, the proposed configuration 400 comprises 12 APs, thereby saving 8 APs.

As can also be seen, the proposed exemplary architecture 400 further comprises multiple concurrent 2.4/5 GHz radio APs 404, which have been configured such that their three channels (1, 6, and 11) do not have inter-channel interference. For instance, although AP 404-1 and 404-4 use the same channel, i.e., 11, they are outside the range of each other, thereby eliminating the possibility of interference. Furthermore, with AP 404-2 and 404-3 having different radio channels (1 and 6), there is no interference even though both the radios are 2.4 GHz radios.

In an embodiment, even through the representation of exemplary AP layout 400 shows four idle channels for 5 GHz radio, namely 153, 157, 161, and 165, the channels may be used in any other new AP to be introduced into the layout or within the same set of dual 5 GHz APs 402. For instance, instead of channel 112 being used in AP 402-5, channel 157 may be incorporated and channel 112 may be kept idle and/or used in another/same AP layout. However, such configuration/association of channels with 5 GHz radio may be based on the possibility of interference that the channel may use with respect to other channels configured on other neighboring 5 GHz radios. For instance, channel 44 of a 5 GHz radio cannot be used in AP 404-2 as such channel may cause interference with respect to the first 5 GHz radio (left) of AP 402-2. The APs 402 may therefore be configured such that there are as many non-repeating channels as possible or even if the channels are repeating, they are spaced out so as to minimize cross channel interference.

According to one embodiment, a network AP layout such as 400 may be configured automatically based on the type of coverage required, network/computer devices to be supported, bandwidth required, among other parameters such that at least one dual concurrent 5 GHz radio AP 402 is incorporated, and the configuration is defined such that co-channel/antenna interference is minimized and RF isolation is incorporated to maintain peak performance of operation. In another embodiment, while configuring APs, energy emitted by client transmissions also needs to be taken into account as when the clients move away from the APs while transmitting, they cause co-channel interference at a much greater range even more than the APs may cause. Therefore, during configuration of multiple dual concurrent 5 GHz radio APs 402 antenna configuration should be such that interference from the clients is avoided/reduced. In an implementation, meta-material type antennas may increase the gain from a particular direction, but also decrease gain in other directions resulting in interference avoidance.

Figure 5:
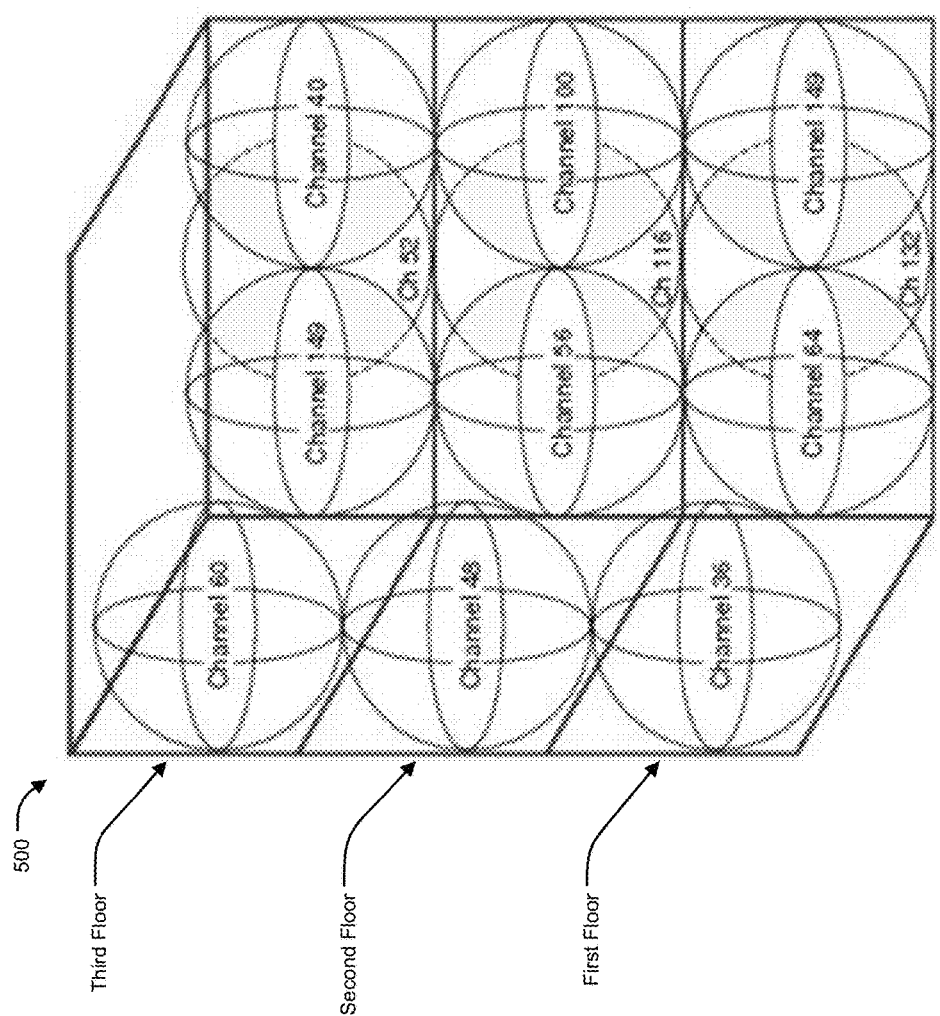
FIG. 5 illustrates an exemplary representation showing a potential channel proximity constraint with configuration of dual 5 GHz radio APs in accordance with an embodiment of the present disclosure.

FIG. 5 illustrates an exemplary representation 500 showing a potential channel proximity constraint with configuration of dual 5 GHz radio APs in accordance with an embodiment of the present disclosure. As shown, representation of AP layout 500 shows multiple APs (shown in circles) configured in a building of, say, 3 floors, wherein four APs on the 3rd floor use channels 60, 149, 52, and 40, four APs on the 2nd floor use channels 48, 56, 116, and 100 respectively, and four APs on the 1st floor use channels 36, 64, 132, and 149 respectively. As can be seen, it remains desirable to be spatially separate the channels, even on a single floor, to avoid co-channel interference as well as near channel interference. For instance, channel 62, if used on the 3rd floor on a specific AP, would cause co-channel interference with the AP using channel 60 and therefore APs should preferably be configured in a manner such that their respective radios use channels that avoid/reduce co-channel interference.

Along with co-channel interference, another problem with the existing architectures is that they would be unable to make use of both radios of the dual concurrent 5 GHz radio APs. Only one of radios would be capable of being used at a given time due to antenna signal coupling issues. It is due to this issue that, at a time, only one of the channels of a dual-radio AP would be usable as shown in representation 500 as is shown in FIG. 5 with where each AP is shown to use one radio channel. For instance, four APs of the 1st floor have been shown to use channels 36, 64, 132, and 149, whereas a second radio using channel 36, would remain idle and not be used in order to prevent signal coupling issues that cause overall throughput to be dramatically reduced due to increased errors and channels not being available.

Figure 6B:
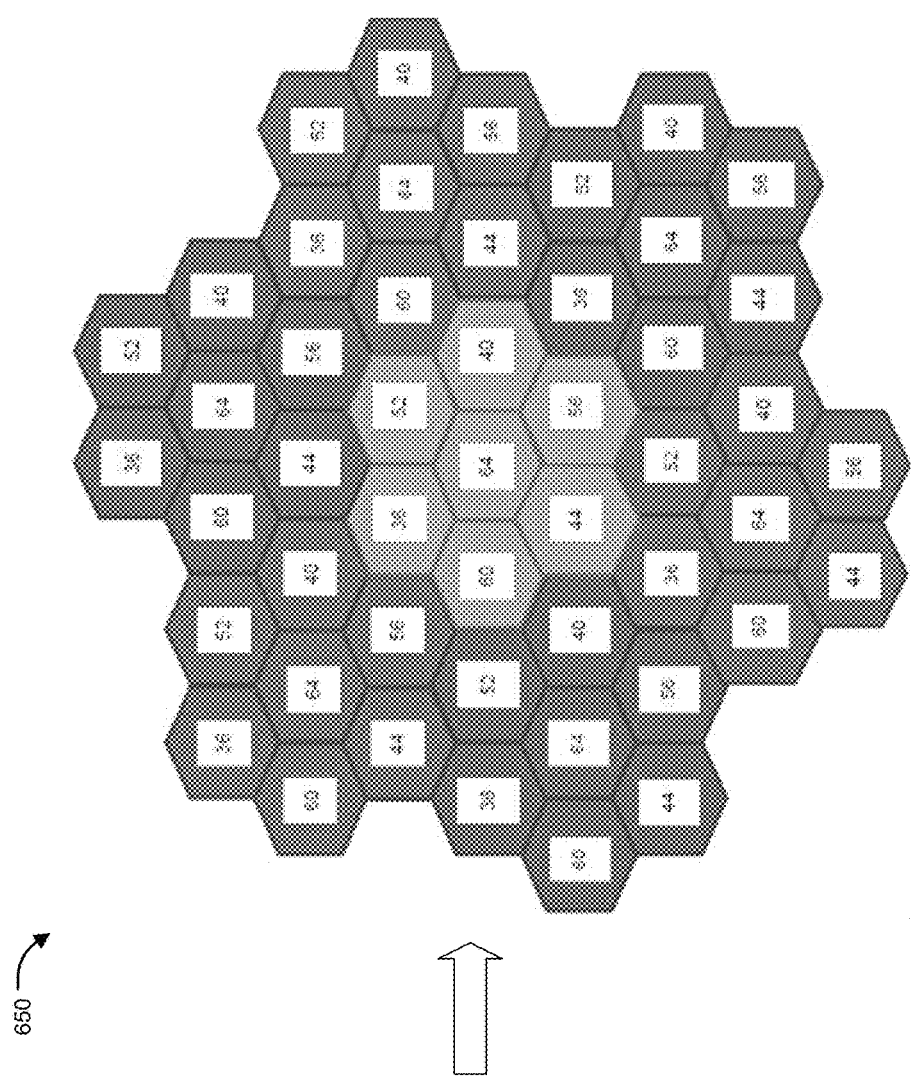
FIGS. 6A and 6B illustrate an exemplary reuse pattern for dual 5 GHz radios configured to minimize both co-channel interference as well as signal coupling issues in accordance with an embodiment of the present invention.
Figure 6A:
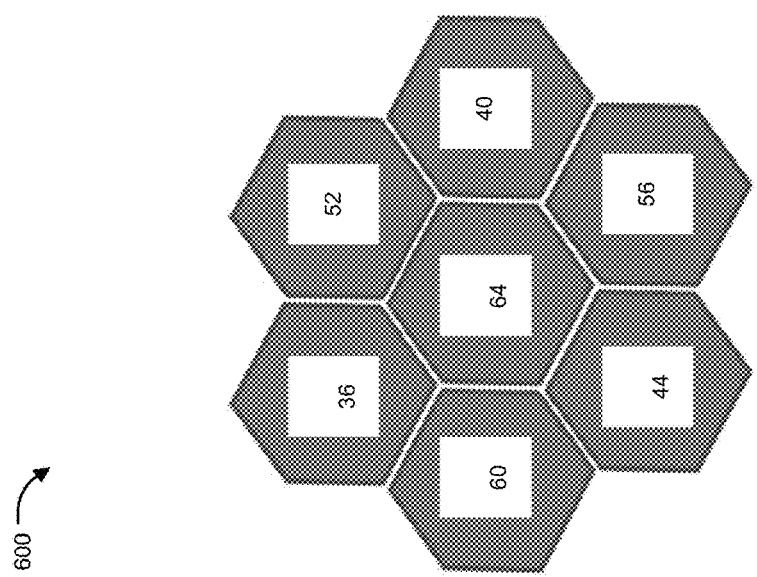

FIGS. 6A and 6B illustrate an exemplary reuse pattern 600 for a dual 5 GHz radio configured to minimize both co-channel interference as well as signal coupling issues. As seen, FIG. 6A illustrates an exemplary hexagonal network cell structure 600 (Mister Fuller structure) having seven APs, each using a single channel/radio of a dual 5 GHz radio, i.e., channels 36, 52, 60, 64, 40, 44, and 56 are used by the seven APs, wherein such a representation reduces the signal coupling issues by using only one channel per radio, and also by using the channels spatially from each other, as channel 36 is far from channel 40 and therefore there would be reduced co-channel interference.

FIG. 6B, on the other hand, shows a reused version 650 of the cell structure shown in FIG. 6A. Although the present structure reduces co-channel interference (by positioning the adjacent channels being used spatially apart from each other) and possible signal coupling (by using one channel at a time), the use of only one channel significantly impacts the potential use of dual 5 GHz APs and therefore new cell configurations that allow both radio channels to be used without sacrificing the co-channel interference/signal coupling would be desirable.

Figure 7:
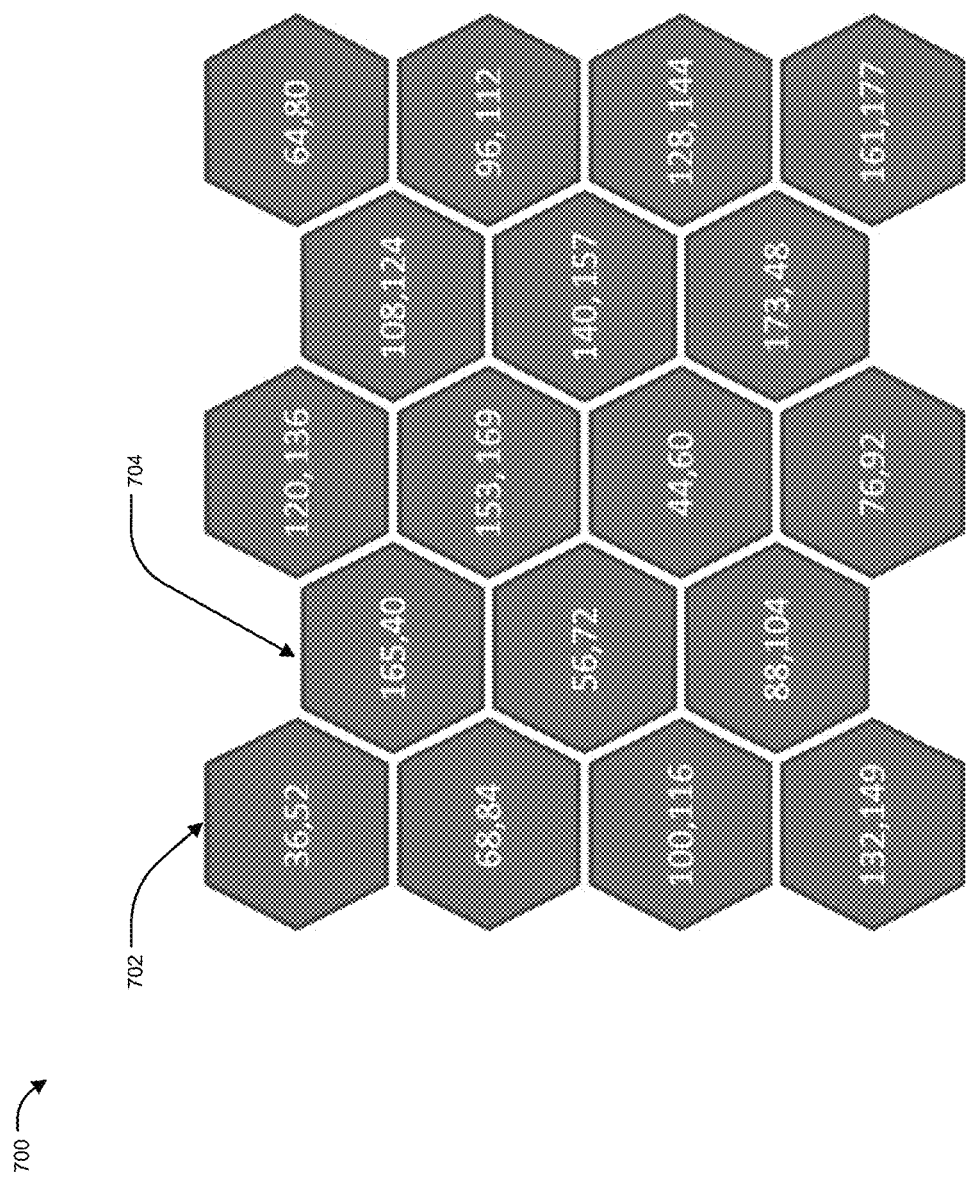
FIG. 7 illustrates an exemplary cell structure using multiple dual concurrent 5 GHz access points in accordance with an embodiment of the present disclosure.

FIG. 7 illustrates an exemplary cell pattern 700 using multiple dual concurrent 5 GHz access points in accordance with an embodiment of the present disclosure. Pattern 700 may, in an implementation, constitute the smallest unit of dual concurrent 5 GHz radio APs. As seen, the pattern 700 may include 18 APs, each having both the radios of 5 GHz APs being used concurrently. Those skilled in the art will appreciate that the proposed pattern 700 is exemplary in nature and any other desired pattern having any other desired shape and number of APs may be configured to implement a desired network design/configuration, and all such configurations are within the scope of the present disclosure. Similarly, any part of the defined pattern 700 may also be used/incorporated. As can be seen, each AP has a radio with spatially far channels so as to reduce co-channel interference. For instance, AP 702 has channels 36 and 52, and AP 704 has channels 165 and 40.

According to one embodiment, the proposed smallest atom 700 may be configured so as to use all the usable/available 36 channels through the 18 APs. Traditionally, this would require 36 2.4/5 GHz APs and therefore the number of APs using the proposed configuration reduces the number of APs by 50% to 18. Also, the neighboring APs and their respective radios may be configured such that co-channel interference is minimized. Therefore, even with respect to neighboring APs, the channels may be spaced out spatially to avoid conflict.

Figure 8:
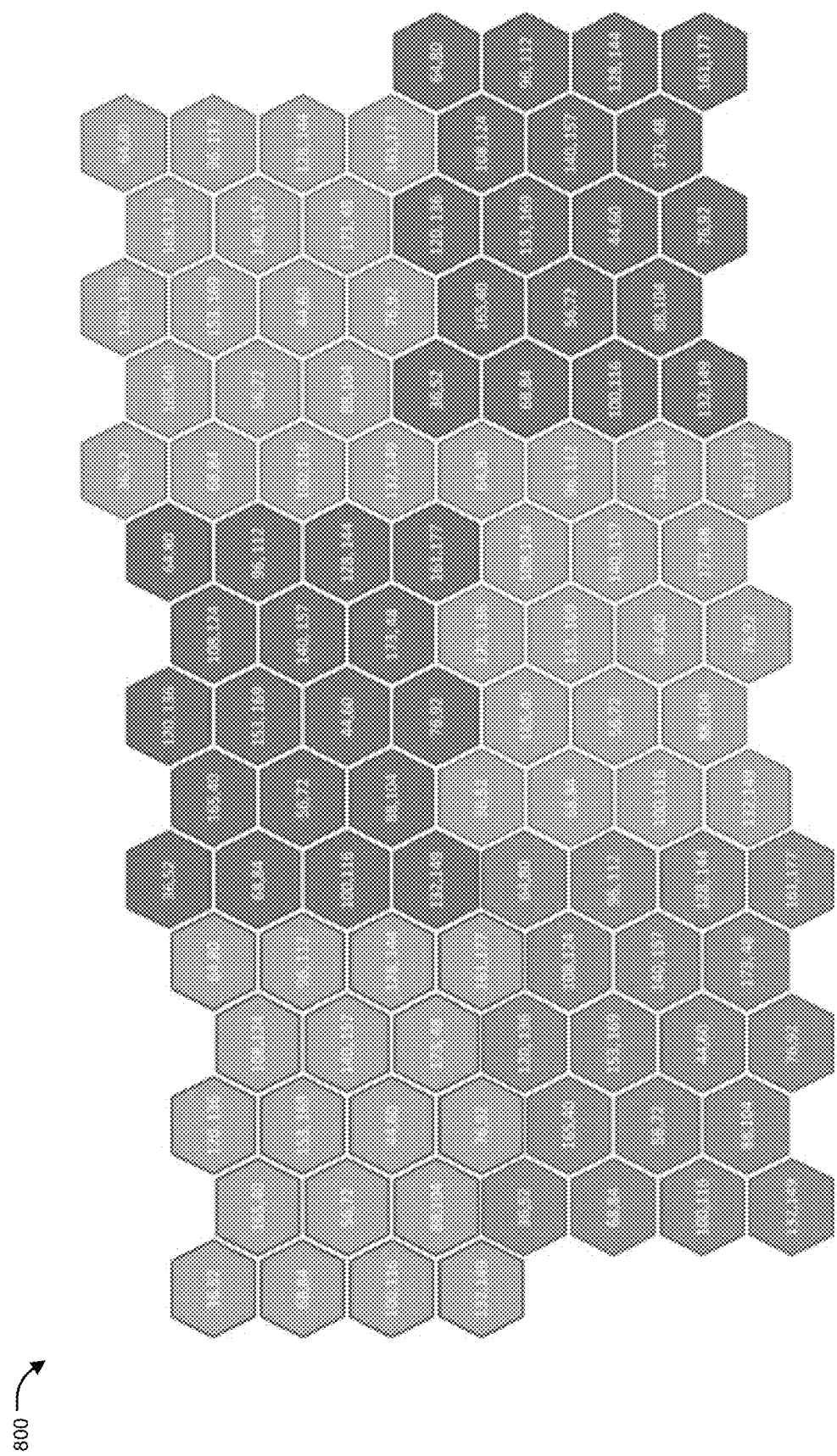
FIG. 8 illustrates an exemplary reuse of the AP cell structure of FIG. 7 in accordance with an embodiment of the present disclosure.

FIG. 8 illustrates an exemplary reuse 800 of AP cell structure 700 as proposed in FIG. 7 in accordance with an embodiment of the present disclosure. As can be seen, the cell structure 700 has been replicated six times. Such reuse is exemplary and any number of reuses of the cell structure 700 or part thereof may be done as part of the scope of the present disclosure.

Figure 9:
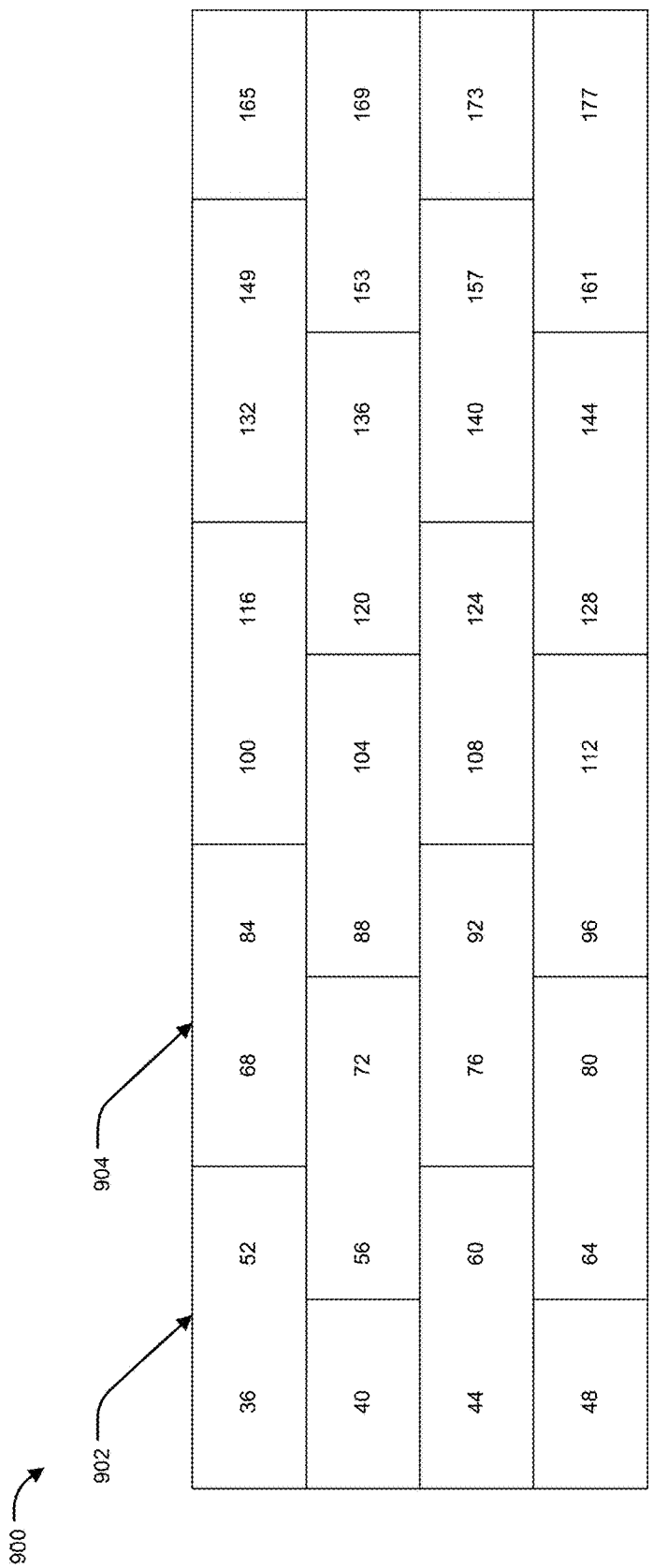
FIG. 9 illustrates an exemplary method of assigning channels to access points based on a desired separation index in accordance with an embodiment of the present disclosure.

FIG. 9 illustrates an exemplary method of assigning channels to APs based on a desired separation index in accordance with an embodiment of the present application. Channel separation table 900 may be different for different APs. In the present example, the desired separation index for adjacent APs is 4 channels. That is, the radios of APs having overlapping coverage and radios within the same AP are to use channels at least 4 channels apart. In one embodiment, table 900 may be used for maintaining a defined separation index such that during channel selection, channels may be assigned to APs to ensure that the defined separation index is met and prevent near channel interference. As such in the present embodiment, AP channels that are at least 4 channels apart may be paired on the same AP and may be used in adjacent APs. As those of ordinary skill in the art will appreciate, other separation indices may be defined, based on which channels may be assigned to each AP.

According to one embodiment, use of a separation index as described herein facilitates avoidance of near channel interference among 5 GHz radios that are in close proximity of each other. As illustrated in table 900, two radios of the first dual concurrent 5 GHz radio AP 902 may be configured to operate at channels 36 and 52, and the two radios of the second dual concurrent 5 GHz radio AP 904 may be configured to operate at channels 68 and 84, and so on.

Those skilled in the art will appreciate that in alternative embodiments other separation indices may be configured between channels within an AP and between channels of adjacent APs. For example, AP channels that are at least eight channels apart may be used to configure the second radio of the same APs or radios of adjacent APs.

Figure 10A:
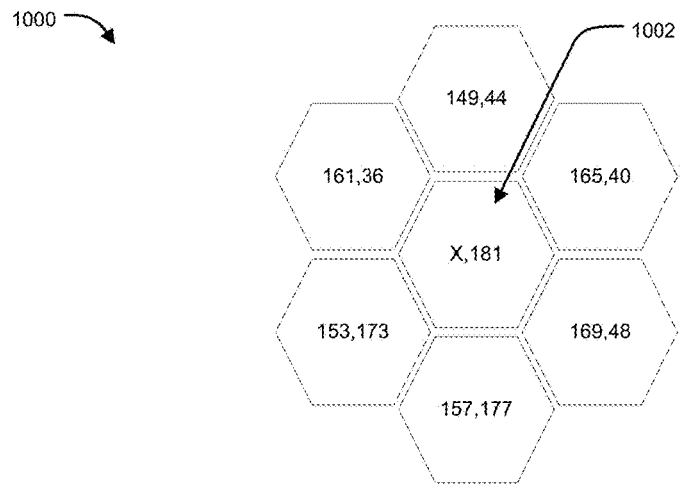
FIGS. 10A and 10B illustrate exemplary patterns of APs comprising a mixture of dual concurrent 5 GHz radio APs and traditional dual radio APs in accordance with various embodiments of the present disclosure.
Figure 10B:
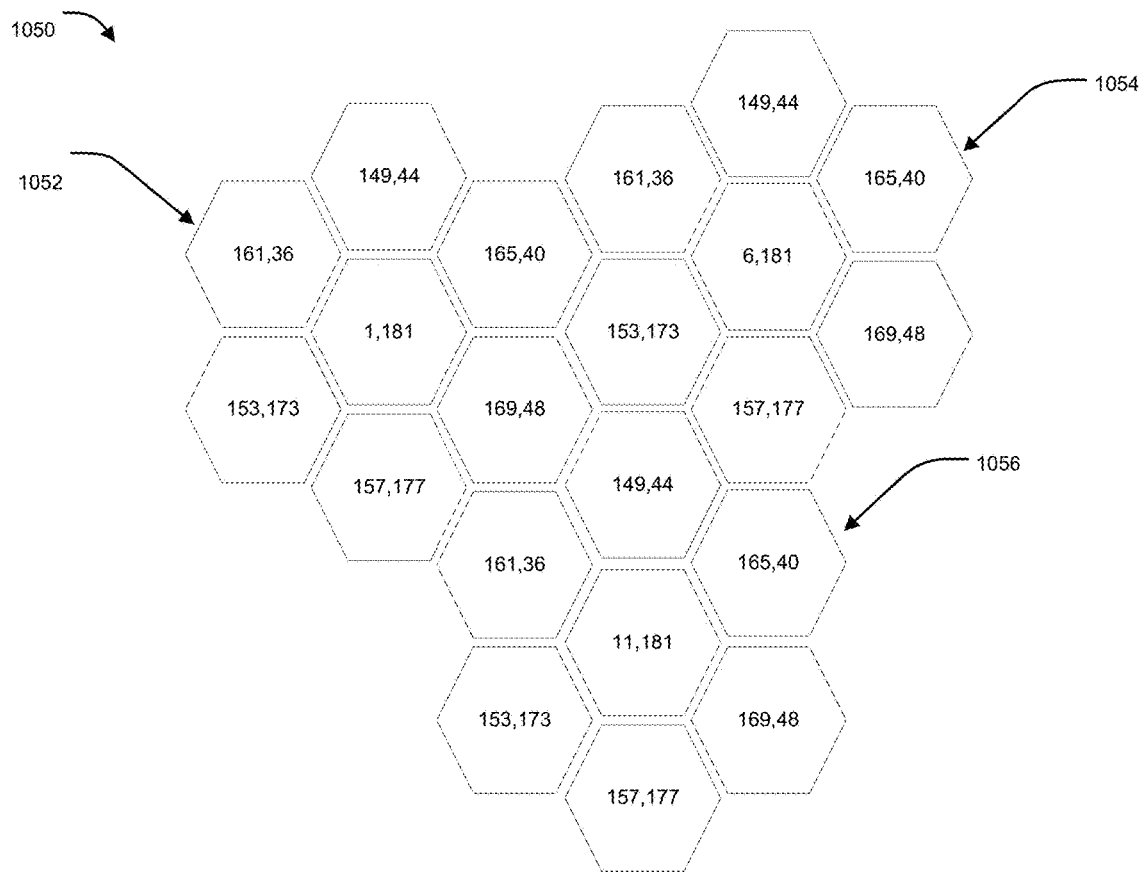

FIGS. 10A and 10B illustrate exemplary patterns of APs comprising a mixture of dual concurrent 5 GHz radio APs and traditional dual radio (one 5 GHz radio and one 2.4 GHz radio) APs in accordance with various embodiments of the present disclosure. According to one embodiment, APs of cell/atom 1000 as illustrated in FIG. 10A include one AP 1002 surrounded by 6 dual 5 GHz APs having optimally assigned channels so as to prevent co-channel and near channel interference. AP 1002 may be selected as a traditional dual radio AP having one 2.4 GHz radio and one 5 GHz radio having a channel 181 assigned thereto. In an implementation, any of channels 1, 6, or 11 of a 2.4 GHz radio may be selected in place of X channel, or channels 1, 7, or 13 may be selected in a European Telecommunications Standards Institute (ETSI) system. Therefore, for cost effectiveness and providing a wider range of coverage, a mixture of dual concurrent 5 GHz radio APs and traditional dual radio APs may be used. As explained earlier, a 2.4 GHz radio provides a wider coverage area, and therefore it may be advantageous to optimally use a combination of both types of dual APs. Cell/atom 1000 of FIG. 10A may therefore also be referred to as the smallest atom using Non-Dynamic Frequency Selection (DFS) enabled radios.

FIG. 10B illustrates yet another reused pattern 1050 showing three atoms 1052, 1054 and 1056, each having seven APs with one 2.4/5 GHz dual radio AP and six 5 GHz dual radio AP in accordance with an embodiment of the present disclosure. As each AP typically has a shared area, each cell/atom may include a 2.4 GHz radio that works on a non-overlapping channel so as to remove co-channel and/or inter-channel interference. As shown, representation 1050 includes atom 1052, 1054, and 1056, wherein the 2.4 GHz radio of atom 1052 uses channel 1, 2.4 GHz radio of atom 1054 uses channel 6, and 2.4 GHz radio of atom 1056 uses channel 11. Using such a configuration, the proposed pattern is able to build a 7 cell 5 GHz channel based architecture having a non-overlapping 2.4 GHz network and 5 GHz networks, thereby providing high density wireless coverage.

Those of ordinary skill in the art will therefore appreciate that illustrations presented in the present disclosure are exemplary in nature, and any number of network configurations using dual concurrent 5 GHz radio APs may be incorporated in the proposed system. Such architecture should be configured such that optimal throughput and minimal interference is achieved.

In addition to assigning the channels to dual 5 GHz radios, and optimally arranging APs for avoiding co-channel and near channel interference, antenna coupling should also be taken into consideration in the context of a high-density installation, wherein antenna coupling may be caused when two antennas in the same frequency band are close to each other and energy from one antenna couples to the other antenna and appears as a received signal. The coupled energy results in loss of gain that would not be present if the antennas were further away or would not transmit into each other, meaning that the antennas don't have a shared coverage area. In an exemplary implementation, antenna coupling may be avoided by means of meta material antennas or alternatively, the use of array antennas that are under software control.

An embodiment of the present disclosure further provides an AP radio antenna steering system configured to manage and prevent coupling of energy from antennas that are in the same frequency band and are placed in close proximity. Software controlled meta-material antenna may be configured to allow achievement of strong beam-shaping properties with high-resolution steerability, wherein angle of the antenna may be changed using a software control algorithm. Such a software control algorithm may be used to select and steer beam direction on a per packet basis, allowing greater gain in the direction of transmission. In addition, in order to improve loss of gain, such beam steering also greatly reduces interference with adjacent 5 GHz antennas, which would be transmitting in a nearby 5 GHz band.

Figure 11:
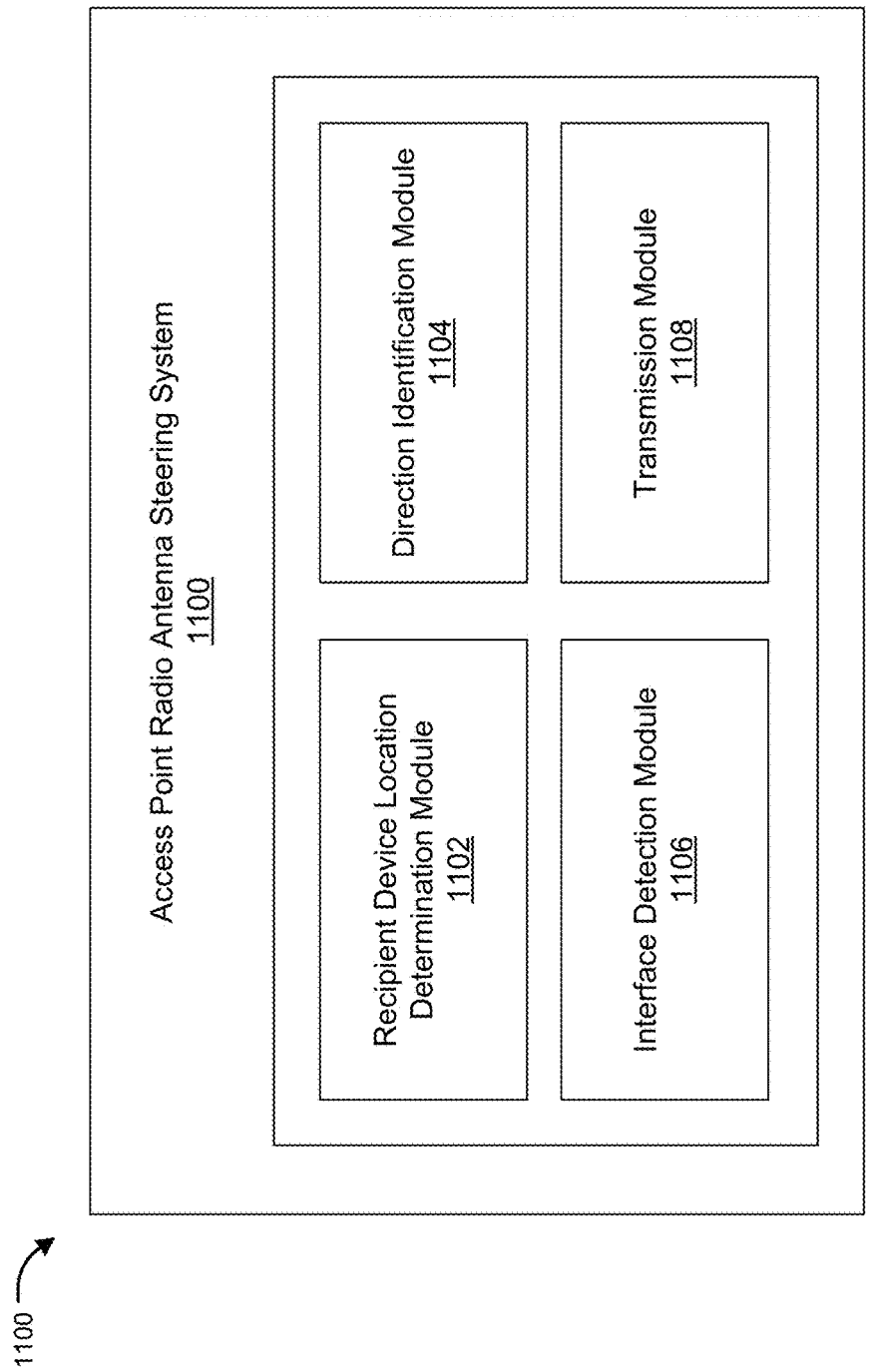
FIG. 11 illustrates exemplary modules of an access point radio antenna steering system in accordance with an embodiment of the present disclosure.

In an example implementation, the antenna steering system enables changes in the order and timing of packets when it is determined that antenna interference would otherwise take place if the packets, as queued, are transmitted as is. With reference to FIG. 11, in an embodiment, antenna steering system 1100 of the present disclosure may include a recipient device location determination module 1102, a direction identification module 1104, an interference detection module 1106, and a transmission module 1108.

FIG. 11 illustrates exemplary modules of an AP radio antenna steering system 1100 in accordance with an embodiment of the present disclosure. In the present example, recipient device location determination module 1102 may be configured to compute locations of recipient devices based on packets queued at radios of a given dual AP. Computation of the location of recipient devices at both radios of the dual AP in conjunction with the known location of the given dual AP identifies the direction in which the antennas needs to be steered for transmission of the packets. For purposes of simplicity, the identified location of the recipient device may be assumed to be static (not moving) for each packet that is in the transmit queue for that recipient device.

In an embodiment, the direction identification module 1104 may be configured to calculate the direction of each radio antenna of the dual AP based on locations of the recipient devices identified in module 1102, wherein such direction, in an instance, may be represented as angles such as 45 degrees, 90 degrees, 135 degrees, 180 degrees, 224 degrees, 270 degrees, which the antenna would have to be directed within the horizontal plane for transmission of packets to respective recipient devices. According to another embodiment, interference detection module 1106 may be configured to determine whether interference would take place if packets, as queued, are transmitted by the two radios of the AP simultaneously. When it is determined that both the radios of the dual radio AP are steered to transmit in the same direction (or the directional antenna beam widths would otherwise overlap), there is a chance of interference, and therefore, once such a condition is detected, transmission module 1108 may be configured to transmit packets without interference such that when the interference detection module 1106 detects that interference would take place, the sequence/order of packet transmission and/or timing of the queued packets of one or more radios is reordered so as to prevent such interference.

In an exemplary implementation, transmission overlap may be avoided by rescheduling transmission sequence of packets directed to receiving device(s) on one or both the radios of the dual concurrent 5 GHz radio AP such that the direction of transmission of packets are configured so as to be different or above a defined threshold for each of the antennas of the two radios. In another exemplary implementation, antennas of either or both the radios may be steered/changed to serve, say another receiving device, in a case where directional overlap between two antennas of the dual radio AP is detected. By changing the direction of one antenna, the potential antenna coupling problems may be avoided.

FIGS. 12A, 12B, and 12C illustrate exemplary packet reordering when potential antenna interference is detected in accordance with an embodiment of the present disclosure. FIG. 12A illustrates angles/direction of transmission for two radio antennas of a dual concurrent 5 GHz AP with respect to their respective receiver devices at different times as calculated by recipient device location determination module 1102 and direction identification module 1104. As illustrated, at a transit time indicated by $T_n$ 1202, both antennas (of Radio 1 and Radio 2 of FIG. 12A) are steered at angle 135°, wherein if both the radios transmit packets at that time in the same direction, issues relating to antenna coupling and/or interference could have occurred. With the proposed interference detection module 1106 being able to determine such possible/probable interference at time $T_n$, the module can flag that packet for out of order transmission, based on which the transmission module 1108 may change the sequence of packets to be transmitted to the receiving device. In an example implementation, the packets may be configured to be transmitted out of order, wherein the transmission module 1108 may, for instance, have an option of transmitting smaller or larger packets out of order by delaying the packet until the overlap is no longer present and/or directional overlap is resolved.

FIG. 12B illustrates re-shuffling of packets to be transmitted based on directional overlap in accordance with an embodiment of the present invention. As seen above with reference to FIG. 12A, with an overlap existing between packets that are both to be transmitted at 135 degrees by both radios of the dual radio AP, packet to be transmitted by Radio 2 of the AP may be moved back in the transmission queue as shown at step 1210 with 1204 showing the current pointer. After such a move, directional overlap may then again be detected at time instance depicted by 1206 of FIG. 12B, with a possibility of both the radios transmitting packets at 45 degrees at time 1206, giving rise to possible interference. To prevent potential conflict, a packet to be transmitted by Radio 1 may be moved back in the transmission queue as shown at step 1212 of FIG. 12B. Such re-shuffling (reordering) of packets to prevent interference may be performed in real-time or on a periodic basis to prevent/minimize interference or other like transmission errors, and may result in a packet transmission queue as shown in FIG. 12C, which does not show a potential directional overlap to occur. In order to avoid potential starvation of the transmit queue of one of the radios of a multiple radio AP, in one embodiment, reordering may alternate between or otherwise cycle through the transmit queues of the radios of an AP. For example, when a packet within the transmit queue of the first radio of a dual radio AP has been reordered, the next reordering may be performed on the transmit queue of the second radio of the dual radio AP and so on.

FIG. 13 is flow diagram 1300 illustrating steering of antenna(s) of a dual radio AP in accordance with an embodiment of the present disclosure. An exemplary method of conducting antenna steering is now explained with reference to FIG. 13, wherein, in the first step 1302, locations of one or more recipient device(s) to which one or more packets are queued for transmission at either of the two radios of an AP may be computed/determined. At step 1304, once the locations of recipient device(s) are determined, the direction of each radio antenna of the AP may be assessed at different time instances based on the packet to be transmitted by the radio and the receiver to which the packet is to be transmitted.

According to one embodiment, at step 1306, it is determined as to whether interference would take place at any time instance by virtue of same/similar direction of transmission by the two radio antennas at that time instance. If it is determined there would be no potential interference, the transmission may be continued at step 1308; otherwise, at step 1308, the transmission sequence/order of one or more packets at either or both the radios of the dual radio AP may be reordered within the transmission queue such the radios can transmit packets without interference by preventing directional overlap at the time of packet transmission such that, for instance, the difference in direction of transmission of packets for each of the radio is greater than a defined threshold (e.g., five degrees, ten degrees, twenty degrees). At step 1310, packet transmission may be performed.

Those skilled in the art will appreciate various packet reordering approaches may be used. For example, the larger of the conflicting packets may be rescheduled to be sent a later time. Alternatively, the smaller of the conflicting packets may be rescheduled to be sent a later time.

Figure 14:
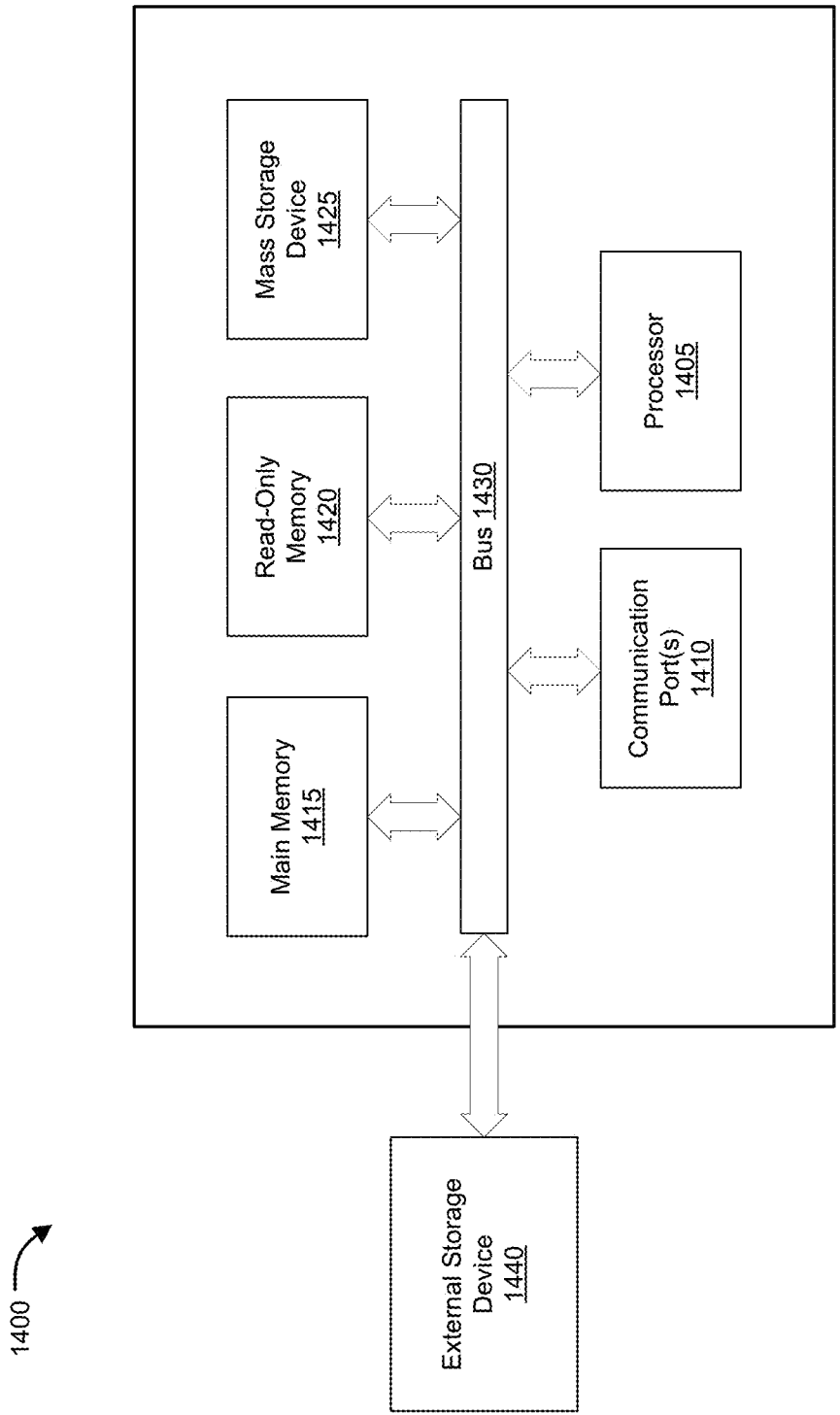
FIG. 14 is an exemplary computer system is an exemplary computer system in which or with which embodiments of the present invention may be utilized.

FIG. 14 is an exemplary computer system is an exemplary computer system in which or with which embodiments of the present invention may be utilized. Computer system 1400 may represent or form a part of an AP (e.g., AP 402) or an AP radio antenna steering system (e.g., AP radio antenna steering system 110), which may be integrated within or implemented separately from an AP.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1400 includes a bus 1430, a processor 1405, communication port 1410, a main memory 1415, a removable storage media 1440, a read only memory 1420 and a mass storage 1425. A person skilled in the art will appreciate that computer system 1400 may include more than one processor and communication ports.

Examples of processor 1405 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1405 may include various modules associated with embodiments of the present invention.

Communication port 1410 can be any of an RS-232 port for use with a modem based dialup connection, a 10/100 Ethernet port, a Gigabit or 10 Gigabit port using copper or fiber, a serial port, a parallel port, or other existing or future ports. Communication port 1410 may be chosen depending on a network, such a Local Area Network (LAN), Wide Area Network (WAN), or any network to which computer system 1400 connects.

Memory 1415 can be Random Access Memory (RAM), or any other dynamic storage device commonly known in the art. Read only memory 1420 can be any static storage device(s) such as, but not limited to, a Programmable Read Only Memory (PROM) chips for storing static information such as start-up or BIOS instructions for processor 1405.

Mass storage 1425 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1430 communicatively couples processor(s) 1405 with the other memory, storage and communication blocks. Bus 1430 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1405 to system memory.

Optionally, operator and administrative interfaces, such as a display, keyboard, and a cursor control device, may also be coupled to bus 1430 to support direct operator interaction with computer system 1400. Other operator and administrative interfaces can be provided through network connections connected through communication port 1410.

Removable storage media 1440 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

The example implementations herein may include both hardware and software elements. Embodiments of the proposed system such as steering system 1100 that are implemented in software include but are not limited to, firmware, resident software, microcode, etc. For example, the microcontroller may be configured to run software either stored locally for example, on access points, or stored and run from a remote site through a communication interface.

In this regard, the software elements may be stored in the form of a computer program product accessible from a computer-usable or computer-readable medium providing program code for use by or in connection with a computer or any instruction execution system. For the purposes of this description, a computer-usable or computer readable medium may be any apparatus that can comprise, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium, fixed or removable.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

What is claimed is:

1. A wireless network architecture comprising:
    a plurality of dual concurrent wireless access points, each comprising dual radios and dual antennas, the dual radios configured to operate in a same frequency band and comprising a plurality of channels within the frequency band;
    wherein the dual radios in each of the plurality of dual concurrent wireless access points are configured with different ones of the plurality of channels;
    wherein the plurality of dual concurrent wireless access points are configured in a cell pattern; and
    wherein the plurality of dual concurrent wireless access points within the cell pattern are configured to use all of the plurality of channels within the frequency band.

2. The wireless network architecture of claim 1, wherein the plurality of dual concurrent wireless access points comprise IEEE 802.11 standard compliant dual radio wireless access points.

3. The wireless network architecture of claim 1, wherein the dual radios in each of the plurality of dual concurrent wireless access points comprise 5 GHz radios.

4. The wireless network architecture of claim 1, wherein the plurality of dual concurrent wireless access points comprise Bluetooth wireless access points.

5. The wireless network architecture of claim 1, wherein the cell pattern comprises a hexagonal pattern.

6. The wireless network architecture of claim 1, wherein the plurality of channels comprises 36 channels, and wherein 18 of the plurality of dual concurrent wireless access points are configured to use all of the 36 channels.

7. The wireless network architecture of claim 1, wherein each overlapping pair of wireless access points in the plurality of dual concurrent wireless access points have a channel separation defined by a separation index.

8. The wireless network architecture of claim 1, wherein the separation index comprises four channels such that each of the overlapping pairs of wireless access points are configured to use channels at least four channels apart.

9. The wireless network architecture of claim 1, wherein the dual antennas comprise directional antennas.

10. The wireless network architecture of claim 8, wherein each of the plurality of dual concurrent wireless access points comprise a transmission module configured to reschedule packet transmissions to prevent interference between the dual antennas.

11. The wireless network architecture of claim 8, wherein each of the plurality of dual concurrent wireless access points comprise a transmission module configured to change a packet transmission order to prevent interference between the dual antennas.

12. The wireless network architecture of claim 8, wherein each of the plurality of dual concurrent wireless access points comprise a direction identification module configured to calculate a direction of each of the dual antennas based on locations of recipient devices.

13. The wireless network architecture of claim 1, wherein the dual radios in each of the plurality of dual concurrent wireless access points comprise 5 GHz radios, the wireless network architecture further comprising a second plurality of dual concurrent wireless access points, each comprising dual radios and dual antennas, wherein one of the dual radios in each of the second plurality of dual concurrent wireless access points comprises a 5 GHz radio and wherein another of the dual radios in each of the second plurality of dual concurrent wireless access points comprises a 2.4 GHz radio.

14. The wireless network architecture of claim 13, wherein the plurality of dual concurrent wireless access points and the second plurality of dual concurrent wireless access points are configured in a cell pattern with the plurality of dual concurrent wireless access points arranged in circles around ones of the second plurality of dual concurrent wireless access points.

15. A method of configuring a wireless network, comprising:
    arranging a plurality of wireless access points comprising dual concurrent radios and dual directional antennas in a cell pattern;
    configuring each radio in the plurality of wireless access points with a different channel according to a channel separation index between adjacent radios;
    calculating transmission angles for packets to be transmitted by each radio based on recipient locations in the cell pattern;
    changing transmission orders of the packets to reduce interference based on the transmission angles, wherein changing transmission orders is cycled through transmit queues of the dual concurrent radios of each of the wireless access points.

16. The method of claim 15, wherein arranging the plurality of wireless access points comprising dual radios and dual directional antennas in a cell pattern comprises forming circles of ones of the plurality of wireless access points comprising dual 5 GHz radios around ones of the plurality of wireless access points comprising both 5 GHz and 2.4 GHz radios.

17. The method of claim 15, wherein arranging the plurality of wireless access points comprising dual radios and dual directional antennas in the cell pattern comprises repeating the circles of ones of the plurality of wireless access points comprising dual 5 GHz radios around ones of the plurality of wireless access points comprising both 5 GHz and 2.4 GHz radios.

18. The method of claim 15, wherein the plurality of wireless access points comprise dual 5 GHz radios comprising 36 available channels, and wherein configuring each radio in the plurality of wireless access points with the different channel comprises configuring 18 of the radios to use the 36 available channels.

19. The method of claim 15, wherein arranging the plurality of wireless access points in the cell pattern comprises arranging the plurality of wireless access points in a three-dimensional cell pattern.

20. A dual radio wireless access point comprising:
- means for computing locations of recipient devices based on packets queued for transmission on a first 5 GHz radio and a second 5 GHz radio of the dual radio wireless access point;
- means for calculating transmission angles to which a first antenna associated with the first 5 GHz radio and a second antenna associated with the second 5 GHz radio should be directed to transmit the packets based on the computed locations;
- means for determining based on a packet queue whether transmissions will cause interference between the first antenna and the second antenna; and
- means for steering at least one of the first antenna and the second antenna to another recipient device to prevent the interference.

* * * * *